(12) United States Patent
Lei et al.

(10) Patent No.: US 9,413,635 B2
(45) Date of Patent: Aug. 9, 2016

(54) METHOD FOR CONTROLLING GENERATION OF ROUTING INFORMATION, METHOD FOR GENERATING ROUTING INFORMATION AND APPARATUSES THEREOF

(71) Applicant: Huawei Technologies Co., Ltd., Shenzhen, Guangdong (CN)

(72) Inventors: Xin Lei, Shenzhen (CN); Bin Yin, Shenzhen (CN); Zhe Huang, Shenzhen (CN); Shengping Xu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 140 days.

(21) Appl. No.: 14/521,144

(22) Filed: Oct. 22, 2014

(65) Prior Publication Data
US 2015/0139028 A1 May 21, 2015

(30) Foreign Application Priority Data
Nov. 18, 2013 (CN) .......................... 2013 1 0576917

(51) Int. Cl.
| | | |
|---|---|---|
| *H04L 12/751* | (2013.01) | |
| *H04L 12/715* | (2013.01) | |
| *H04L 12/741* | (2013.01) | |
| *H04L 12/24* | (2006.01) | |
| *H04L 12/64* | (2006.01) | |

(52) U.S. Cl.
CPC ............ *H04L 45/02* (2013.01); *H04L 12/6418* (2013.01); *H04L 41/0853* (2013.01); *H04L 45/46* (2013.01); *H04L 45/54* (2013.01); *H04L 45/64* (2013.01); *H04L 45/74* (2013.01)

(58) Field of Classification Search
CPC ......... H04L 45/02; H04L 45/46; H04L 45/64; H04L 45/74; H04L 45/54; H04L 41/0853; H04L 12/6418
See application file for complete search history.

(56) References Cited

U.S. PATENT DOCUMENTS

| | | | |
|---|---|---|---|
| 2010/0322255 A1 | 12/2010 | Hao et al. | |
| 2012/0173757 A1* | 7/2012 | Sanden | G06F 9/45558 709/238 |
| 2013/0013809 A1 | 1/2013 | Vasseur et al. | |
| 2013/0238802 A1 | 9/2013 | Sarikaya | |

FOREIGN PATENT DOCUMENTS

EP 2618535 A1 7/2013

OTHER PUBLICATIONS

Mishra et al., "Dynamic Resource Management Using Virtual Machine Migrations," IEEE Communications Magazine, pp. 34-40, vol. 50, Issue 9, Institute of Electrical and Electronics Engineers, New York, New York (Sep. 2012).

* cited by examiner

*Primary Examiner* — Christopher Grey
(74) *Attorney, Agent, or Firm* — Leydig, Voit & Mayer, Ltd.

(57) ABSTRACT

The present invention provides a method for controlling generation of routing information, a method for generating routing information, and apparatuses thereof. When it is detected that a virtual machine is migrated out of or migrated into a data center, a subnet to which the virtual machine belongs is determined, a route control identifier for adjusting routing information of a virtual machine that belongs to the subnet and is in the data center is determined, and the route control identifier is sent to the data center, so that the data center adjusts, according to the route control identifier, routing information of the virtual machine that belongs to the subnet and is in the data center. In this way, generation of many host routes in data centers when a virtual machine is migrated across the data centers is prevented.

16 Claims, 4 Drawing Sheets

METHOD FOR CONTROLLING GENERATION OF ROUTING INFORMATION, METHOD FOR GENERATING ROUTING INFORMATION AND APPARATUSES THEREOF

CROSS-REFERENCE TO RELATED APPLICATION

This application claims priority to Chinese Patent Application No. 201310576917.1, filed on Nov. 18, 2013, which is hereby incorporated by reference in its entirety.

TECHNICAL FIELD

The present invention relates to the field of communications technologies, and in particular, to a method for controlling generation of routing information, a method for generating routing information, and apparatuses thereof.

BACKGROUND

At present, to resolve problems of migration, a lot of supported combinations, and the like of a virtual machine (VM), caused by virtualization of a server in a data center, a Network Virtualization Overlay (NVO) technology applied to a data center network emerges at the right moment.

Due to an application of the network virtualization overlay technology, a lot of virtual machines may be deployed in the data center. However, a lot of host routes may be generated in each router during a process of migrating a current virtual machine across the data center. If a lot of virtual machines are migrated, the number of routes in a router may increase. Therefore, when a packet is forwarded to a migrated VM, a plurality of times of route matching needs to be performed to identify a correct route corresponding to the VM for forwarding the packet. In this case, the speed of forwarding the packet by a router is reduced, and forwarding efficiency of the router is also reduced.

SUMMARY

The present invention provides a method for controlling generation of routing information, a method for generating routing information, and apparatuses thereof, to resolve problems of a low packet forwarding speed and low forwarding efficiency of a router due to a lot of host routes generated during migration of a virtual machine in the prior art.

A first aspect of the present invention provides a method for controlling generation of routing information, including:

when it is detected that a virtual machine is migrated out of or migrated into a data center, determining a subnet to which the virtual machine belongs;

acquiring the total number of virtual machines included in the subnet, and acquiring the number of virtual machines that belong to the subnet and are in the data center;

determining a ratio of the number of the virtual machines that belong to the subnet and are in the data center to the total number of virtual machines included in the subnet;

generating, according to a result of comparison between the ratio and a preset threshold, a route control identifier for adjusting routing information of a virtual machine that belongs to the subnet and is in the data center; and sending the route control identifier to the data center, where the route control identifier is used to instruct the data center to adjust, according to the route control identifier, routing information of the virtual machine that belongs to the subnet and is in the data center.

A second aspect of the present invention provides a method for generating routing information, including:

when a virtual machine is migrated out of or migrated into a data center, determining a subnet to which the virtual machine belongs; and adjusting, according to a received route control identifier for adjusting routing information, routing information of a virtual machine that belongs to the subnet and is in the data center.

A third aspect of the present invention provides an apparatus for controlling generation of routing information, including:

a determining module, configured to: when it is detected that a virtual machine is migrated out of or migrated into a data center in which the apparatus is located, determine a subnet to which the virtual machine belongs;

an acquiring module, configured to acquire the total number of virtual machines included in the subnet, and acquire the number of virtual machines that belong to the subnet and are in the data center;

a processing module, configured to determine a ratio of the number of the virtual machines that belong to the subnet and are in the data center to the total number of virtual machines included in the subnet;

an identifier generating module, configured to: according to a result of comparison between the ratio and a preset threshold, generate a route control identifier for adjusting routing information of a virtual machine that belongs to the subnet and is in the data center; and a communicating module, configured to send the route control identifier to the data center, where the route control identifier is used to instruct the data center to adjust, according to the route control identifier, the routing information of the virtual machine that belongs to the subnet and is in the data center.

A fourth aspect of the present invention provides an apparatus for generating routing information, including:

a determining module, configured to: when a virtual machine is migrated out of or migrated into a data center in which the apparatus is located, determine a subnet to which the virtual machine belongs; and an adjusting module, configured to: according to a received route control identifier for adjusting routing information, adjust routing information of a virtual machine that belongs to the subnet and is in the data center.

A fifth aspect of the present invention provides a virtual machine management server, including:

a processor, configured to: when it is detected that a virtual machine is migrated out of or migrated into a data center connected to the virtual machine management server, determine a subnet to which the virtual machine belongs, acquire the total number of virtual machines included in the subnet, acquire the number of virtual machines that belong to the subnet and are in the data center, determine a ratio of the number of the virtual machines that belong to the subnet and are in the data center to the total number of virtual machines included in the subnet, and generate, according to a result of comparison between the ratio and a preset threshold, a route control identifier for adjusting routing information of a virtual machine that belongs to the subnet and is in the data center; and a communications interface, connected to the processor and configured to send the route control identifier generated by the processor to the data center, where the route control identifier is used to instruct the data center to adjust, according to the route control identifier, the routing information of the virtual machine that belongs to the subnet and is in the data center.

A sixth aspect of the present invention provides a gateway device, including:

a communications interface, configured to: when a virtual machine is migrated out of or migrated into a data center in which the gateway device is located, receive a route control identifier for adjusting routing information; and a processor, configured to determine a subnet to which the virtual machine belongs, and adjust, according to the received route control identifier, routing information of a virtual machine that belongs to the subnet and is in the data center.

In the embodiments of the present invention, when it is detected that a virtual machine is migrated out of or migrated into a data center, a subnet to which the virtual machine belongs is acquired, the total number of virtual machines included in the subnet is acquired, the number of virtual machines that belong to the subnet and are in the data center is acquired, a ratio of the number of the virtual machines that belong to the subnet and are in the data center to the total number of virtual machines included in the subnet is determined, a route control identifier for adjusting routing information of a virtual machine in the data center is generated according to a result of comparison between the ratio and a preset threshold, and the route control identifier is sent to the data center, where the route control identifier determines whether the data center generates a host route or a network segment route for the migrated-out or migrated-in virtual machine. In this way, generation of many routes in data centers when a virtual machine is migrated across the data centers is prevented, route matching operations for a router in the data centers are simplified, and a forwarding speed and forwarding efficiency of the router are increased.

DESCRIPTION OF EMBODIMENTS

First, a current tenant (a tenant is an enterprise or organization) may build a Virtual Private Network (VPN) by using a virtual machine overlay technology, to ensure that a network of the current tenant is isolated from that of another tenant. One or more data centers may be built in one VPN, and the built data centers may be managed by using a virtual machine management server. The virtual machine management server may allocate one or more virtual subnets to one data center, and each virtual subnet has its own virtual subnet identification (VSID). Because these virtual subnets are located in the same VPN, virtual machines in these subnets can communicate with each other.

Generally, many virtual machines may be deployed in one data center, and packets sent by the virtual machines may carry a VSID of a subnet to which the virtual machines belong, so a network device receiving the packets may determine, by using the VSID, the subnet to which the virtual machines belong. In addition, the deployed virtual machines may be located at different network virtualization edges (English: NVE), that is, a correspondence exists between the virtual machines and the network virtualization edges. The correspondence illustrates the NVE of the virtual machines in the data center, and the packets received by the data center may be forwarded to the virtual machines by using the NVE. Therefore, the correspondence determines routes of the virtual machines.

Each virtual machine corresponds to a route. However, when a virtual machine is migrated across data centers, a data center into which the virtual machine is migrated re-generates a host route of the virtual machine. If a plurality of virtual machines is migrated across the data centers, a plurality of host routes may be generated, so that a router in the data center stores a plurality of host routes. Therefore, when a router in the data center forwards a packet every time, a correct route of the virtual machine is identified through many times of matching, which directly reduces packet forwarding efficiency of the router.

To resolve the foregoing technical problem, the embodiments of the present invention provides a method for controlling generation of routing information. When it is detected that a virtual machine is migrated into or migrated out of a data center, a virtual machine management server generates different route control identifiers to control the data center, so that the data center adjusts routing information of the virtual machine in the data center. Specifically, the virtual machine management server enables the data center to generate a network segment route or a host route corresponding to the virtual machine or delete a host route or a network segment route. Therefore, the problem that the forwarding efficiency of the router is reduced due to a lot of routes generated by the data center when the virtual machine is migrated into the data center is resolved.

The following describes the technical solutions of the present invention in detail with reference to the accompanying drawings and specific embodiments. It should be understood that the embodiments of the present invention and technical features in the embodiments are merely to describe the technical solutions of the present invention rather than limit them.

Embodiment 1

Figure 1:
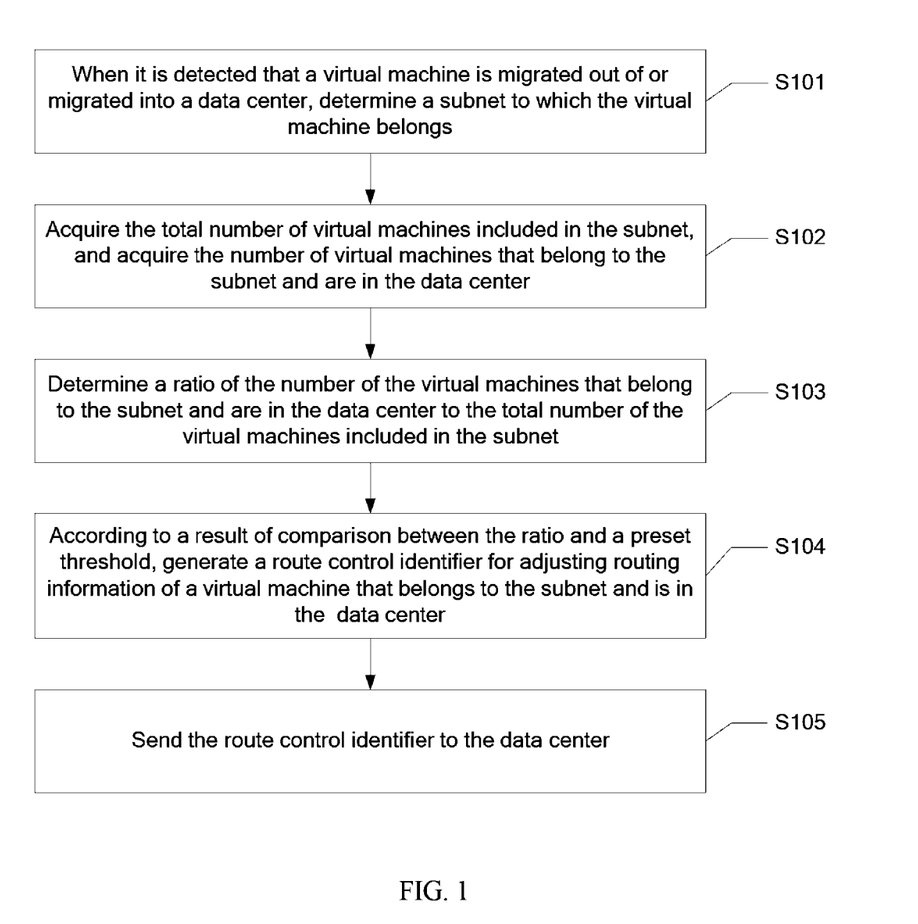
FIG. 1 is a flowchart of a method for controlling generation of routing information according to an embodiment of the present invention.

FIG. 1 is a flowchart of a method for controlling generation of routing information according to an embodiment of the present invention. The method in this embodiment is executed by a virtual machine management server. In this embodiment of the present invention, a data center communicates with the virtual machine management server, and the virtual machine management server may manage one or more data centers.

The method in this embodiment of the present invention includes the following steps:

S101. When it is detected that a virtual machine is migrated out of or migrated into a data center, determine a subnet to which the virtual machine belongs.

S102. Acquire the total number of virtual machines included in the subnet, and acquire the number of virtual machines that belong to the subnet and are in the data center.

S103. Determine a ratio of the number of the virtual machines that belong to the subnet and are in the data center to the total number of the virtual machines included in the subnet.

S104. According to a result of comparison between the ratio and a preset threshold, generate a route control identifier for adjusting routing information of a virtual machine that belongs to the subnet and is in the data center.

S105. Send the route control identifier to the data center.

When the virtual machine management server detects that a virtual machine is migrated into or migrated out of the data center, the virtual machine management server determines a virtual subnet identification VSID of the virtual machine that is migrated into or migrated out of the data center, where the VSID represents a subnet to which the virtual machine belongs, and the VSID may be a specific value and is carried in a packet sent by the virtual machine. A plurality of virtual machines may be included in the subnet; and the virtual machines in the subnet may be deployed in one or more data centers.

After the subnet to which the virtual machine that is migrated into or migrated out of the data center is located is determined, it is required to determine the number of virtual machines that belong to the subnet and are in the data center, and then determine the total number of virtual machines which belong to the subnet; then a ratio of the number of the virtual machines that belong to the subnet and are in the data center to the total number of the virtual machines belong to the subnet is obtained.

A preset threshold is stored in the virtual machine management server, and the preset threshold is configured to determine whether to advertise a network segment route or to advertise a host route of a virtual machine for a specific subnet in a data center.

The virtual machine management server compares the acquired ratio with the preset threshold, generates a route control identifier corresponding to the VSID according to an acquired result of comparison, and sends the generated route control identifier to a network gateway of the data center. The route control identifier is used to instruct the data center to generate a network segment route or a host route for the subnet to which the virtual machine belongs. It should be noted herein that, when a path is selected for forwarding a packet, because a host route corresponds to accurate address information, a path corresponding to the host route may be preferably selected, and a network segment route may be selected when no host route is identified.

Specifically, a process of generating a route control identifier when a virtual machine is migrated out of or migrated into the data center is as follows:

Case 1: The virtual machine management server detects that a virtual machine is migrated out of the data center.

VM1, VM2, VM3, and VM4 are deployed in the data center, and the four deployed virtual machines are virtual machines belong to a first subnet corresponding to VSID 1. The foregoing four virtual machines are bound with one network virtualization edge in the data center. It is advertised by the data center that the foregoing virtual machines share a network segment route 10.0.0.0/24 of the first subnet, that is, packets that need to be processed by these virtual machines may be forwarded to corresponding virtual machines through the network segment route.

When the virtual machine management server detects that VM 1 in the data center is migrated out of the data center, the virtual machine management server determines that VM 1 belongs to the first subnet according to a packet sent by VM 1. Then the virtual machine management server determines the total number of virtual machines in the first subnet, that is, determines the total number of virtual machines that belong to the first subnet and are in all data centers.

As the total number of the virtual machines in the first subnet varies, the route control identifier generated by the virtual machine management server includes the following two sub-cases:

Sub-Case 1:

If the total number of the virtual machines deployed in the first subnet is 20, a ratio of the number of the virtual machines that belong to the first subnet and are in the data center to the total number of the virtual machines in the first subnet is 3/20, the virtual machine management server compares the acquired ratio with the preset threshold. Assuming that the preset threshold is 60%, the acquired ratio is less than the preset threshold, which indicates that only a few virtual machines in the first subnet are deployed in the data center. It should be noted that, to avoid a route conflict, one subnet merely has one network segment route, and the other virtual machines belong to the subnet correspond to host routes. Therefore, if the network segment route of the first subnet is retained in the data center in which a few virtual machines are deployed, virtual machines that belong to the first subnet and are in another data center may generate host routes, so that the number of routes increases.

Therefore, when the ratio is less than the preset threshold, the virtual machine management server may generate a host route control identifier, and send the host route control identifier to a gateway device of the data center. If the gateway device advertises the network segment route of the first subnet, the gateway device deletes the network segment route of the first subnet, that is, deletes the route 10.0.0.0/24, and generates host routes of all virtual machines that belong to the first subnet and are still in the data center, that is, host routes of VM 2, VM 3, and VM 4; if the gateway device advertises host routes of all the virtual machines in the first subnet, the gateway device deletes a host route of the virtual machine migrated out of the data center.

Sub-Case 2:

If the virtual machine management server determines that the total number of virtual machines that belong to the first subnet is four, the ratio of the number of the virtual machines that belong to the first subnet and are in the first data center to the total number of the virtual machines in the first subnet is 3/4, and this ratio exceeds 60%. Therefore, a lot of virtual machines in the first subnet are deployed in the data center. In this case, the virtual machine management server generates a network segment route control identifier. If the gateway device in the data center advertises the network segment route 10.0.0.0/24 of the first subnet, the network segment route 10.0.0.0/24 is retained.

If the gateway device in the data center advertises a host route of a virtual machine in the first subnet, the gateway device deletes the host route of the first subnet in the data center, and generates the network segment route of the first subnet in the data center, where the network segment route of the first subnet may be generated according to a correspondence between address information of the virtual machine that belongs to the first subnet and is in the data center and address information of a network virtualization edge.

The two foregoing sub-cases illustrate that when a virtual machine is migrated out of a data center, a virtual machine management server may generate different route control identifiers for different ratios, thereby controlling the data center, so that the control center adjusts a route of the virtual machine according to the route control identifiers.

Case 2: The virtual machine management server detects that a virtual machine is migrated into the data center:

When detecting that VM 1 is migrated into the data center, the virtual machine management server determines a first subnet to which VM 1 belongs, and the virtual machine management server sends, to the data center, a basic configuration file of VM 1 and a correspondence between address information of VM 1 and address information of a network virtualization edge in the data center; and the data center may configure VM 1 in the data center according to the basic configuration file of VM 1, and then generate a route for VM 1 according to the correspondence between the address information of VM 1 and the address information of the network virtualization edge.

The virtual machine management server determines the number of virtual machines that belong to the first subnet and are in the data center, and determines the total number of virtual machines in the first subnet, that is, determines the total number of virtual machines that belong to the first subnet and are in all data centers.

As the total number of the virtual machines in the first subnet varies, the route control identifier generated by the virtual machine management server includes the following two sub-cases:

Sub-Case 1:

When the number of the virtual machines that belong to the first subnet and are in the data center is two, that is, VM 1 and VM 2, and the total number of the virtual machines in the first subnet is eight.

The virtual machine management server acquires a ratio of the number of the virtual machines that belong to the first subnet and are in the data center to the total number of the virtual machines in the first subnet, that is, 2/8, and this ratio indicates that a few virtual machines in the first subnet are deployed in the data center. The virtual machine management server compares the acquired ratio with the preset threshold, and here it is assumed that the preset threshold is 60%.

Apparently, the acquired ratio is less than the preset threshold. In this case, the virtual machine management server generates a host route control identifier, and sends the host route control identifier to a gateway device in the data center. If the gateway device in the data center advertises a host route of a virtual machine that belongs to the first subnet and is in the data center, the host route control identifier here instructs the data center to generate a host route of VM 1; if the gateway device in the data center advertises a network segment route of the first subnet, the host route control identifier here instructs the data center to delete the network segment route of the first subnet, generate a host route of the VM 1 that is migrated into the data center, and generate a host route of an original virtual machine VM 2 that belongs to the first subnet and is in the data center.

Sub-Case 2:

If there are other virtual machines that belong to the first subnet and are in the data center before VM 1 is migrated in, assuming that the number of virtual machines that belong to the first subnet and are in the data center after VM 1 is migrated into is six and the total number of virtual machines that belong to the first subnet is eight, the virtual machine management server acquires a ratio of the number of the virtual machines that belong to the first subnet and are in the data center to the total number of the virtual machines in the first subnet, that is, 6/8=75%. This ratio exceeds the preset threshold, which indicates that a lot of virtual machines in the first subnet have been deployed in the data center, and the virtual machine management server may generate a network segment route control identifier, and send the network segment route control identifier to a gateway device of the data center.

When the gateway device in the data center has advertised host routes of six virtual machines deployed in the first subnet, the host routes of the six virtual machines are deleted, and then the network segment route 10.0.0.0/24 is generated, and the generated network segment route serves as a route of the six virtual machines.

When the gateway device in the data center has advertised a network segment route for five virtual machines deployed in the first subnet, a router retains the network segment route, and the newly migrated-in virtual machine also uses the network segment route.

In this embodiment of the present invention, when it is detected that a virtual machine is migrated out of or migrated into a data center, a subnet to which the virtual machine belongs is acquired, the total number of virtual machines included in the subnet is acquired, the number of virtual machines that belong to the subnet and are in the data center is acquired, a ratio of the number of the virtual machines that belong to the subnet and are in the data center to the total number of virtual machines included in the subnet is determined, a route control identifier for adjusting routing information of a virtual machine in the data center is generated according to a result of comparison between the ratio and a preset threshold, and the route control identifier is sent to the data center, where the route control identifier determines whether the data center generates a host route or a network segment route for the virtual machine that is migrated out of or migrated into the data center. In this way, generation of many routes in data centers when a virtual machine is migrated across the data centers is prevented, route matching operations for a router in the data centers are simplified, and a forwarding speed and forwarding efficiency of the router are increased.

The foregoing embodiment illustrates a method for performing route control in different cases for two data centers, but the technical solutions of the present invention are not limited to the foregoing embodiment. For example, if four virtual machines in a first subnet are deployed in a first data center, six virtual machines in the first subnet are deployed in a second data center, 10 virtual machines in the first subnet are deployed in a third data center, the number of virtual machines that are deployed in the first data center and in the first subnet accounts for 20%, the number of virtual machines that are deployed in second data center and in the first subnet accounts for 30%, and the number of virtual machines that are deployed in the third data center and in the first subnet accounts for 50%. In this case, a virtual machine management server may send a network segment route control identifier to the third data center, and send host route control identifiers to the first data center and the second data center. That is, a data center with a largest proportion of virtual machines may generate one network segment route for all virtual machines in the first subnet, a data center with a smaller proportion of virtual machines may generate host routes for the virtual machine in the first subnet. In this way, it is ensured that not all data centers generate host routes, thereby preventing generation of a lot of routes in the data centers after a virtual machine is migrated, simplifying route matching operations for a router in the data centers, and increasing a forwarding speed and forwarding efficiency of the router.

A method for performing route control for a plurality of data centers is completely the same as the foregoing manner, which is not described herein again.

Embodiment 2

Figure 2:
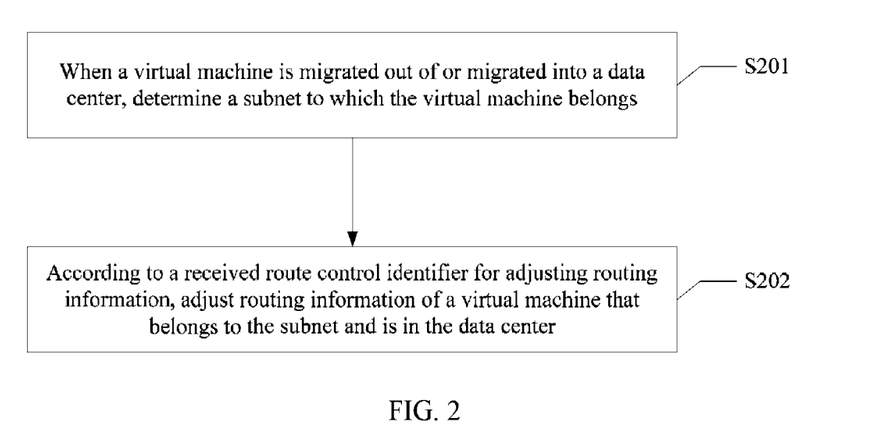
FIG. 2 is a flowchart of a method for generating routing information according to an embodiment of the present invention.

This embodiment of the present invention further provides a method for generating routing information. FIG. 2 is a flowchart of a method for generating routing information according to this embodiment of the present invention. The method in this embodiment is executed by a gateway device in a data center.

The method in this embodiment of the present invention includes:

S201. When a virtual machine is migrated out of or migrated into a data center, determine a subnet to which the virtual machine belongs.

S202. According to a received route control identifier for adjusting routing information, adjust routing information of a virtual machine that belongs to the subnet and is in the data center.

When a virtual machine is migrated out of or migrated into the data center, a gateway device in the data center receives a route control identifier sent by a virtual machine management server, where the route control identifier determines whether the gateway device generates a host route or a network segment route for a virtual machine in the subnet to which the virtual machine migrated out of or migrated into the data center belongs. The following describes implementation manners in different cases in detail.

Case 1: A Virtual Machine is Migrated Out of the Data Center.

When the data center has advertised a network segment route of the subnet and a route control identifier received by the gateway device of the data center is a host route control identifier, the gateway device deletes the network segment route of the subnet to which the virtual machine migrated out of the data center belongs, and generates host routes of all virtual machines that belong to the subnet and are in the data center; when a route control identifier received by the gateway device of the data center is a network segment route control identifier, the gateway device retains the network segment route of the virtual machine migrated out of the data center, and all virtual machines that belong to the subnet and are in the data center can still communicate with virtual machines in another data center by using the network segment route.

When the gateway device in the data center has advertised host routes of all virtual machines that belong to the subnet and are in the data center and a route control identifier received by the gateway device in the data center is a host route control identifier, the gateway device deletes an host route of the migrated-out virtual machine, and host routes of the other virtual machines that belong to the subnet and are in the data center continue to be used; when receiving a network segment route control identifier, the gateway device deletes the host routes of all the virtual machines that belong to the subnet and are in the data center, and generates a network segment route of the subnet.

For example, if four virtual machines of VM 1, VM 2, VM 3, and VM 4 in a first subnet are deployed in the data center, VM 1 is migrated out of the data center, a route that is shared by VM 1, VM 2, VM 3, and VM 4 and advertised outwards by the data center before VM 1 is migrated out is a network segment route 10.0.0.0/24, if the gateway device in the data center receives one host route control identifier, the gateway device in the data center deletes the network segment route 10.0.0.0/24 according to the host route control identifier, and generates host routes 10.0.0.2/33, 10.0.0.3/35 and 10.0.0.4/40 of VM 2, VM 3, and VM 4, where the host routes are generated according to a correspondence between a virtual machine and a network virtualization edge. If the gateway device in the data center receives a network segment route control identifier, the gateway device in the data center may not change a network segment route of a virtual machine in the first subnet according to the network segment route control identifier, that is, VM 2, VM 3, and VM 4 still use the network segment route 10.0.0.0/24.

In addition, when routes of VM 1, VM 2, VM 3, and VM 4, which are advertised outwards by the data center before VM 1 is migrated out, are respectively 10.0.0.1/32, 10.0.0.2/33, 10.0.0.3/35 and 10.0.0.4/40, if the gateway device in the data center receives a host route control identifier, the gateway device deletes the host route 10.0.0.1/32 of VM 1 according to the host route control identifier, and the routes of VM 2, VM 3, and VM 4 are not adjusted; if the gateway device in the data center receives a network segment route control identifier, the gateway device deletes the host routes of VM 1, VM 2, VM 3, and VM 4 in the first subnet, generates the network segment route 10.0.0.0/24 of the first subnet.

Case 2: A Virtual Machine is Migrated into the Data Center.

When a virtual machine is migrated into the data center, the gateway device in the data center may receive a basic configuration file of the virtual machine migrated into the data center and a correspondence between address information of the virtual machine migrated into the data center and address information of a network virtualization edge of the data center, and then the data center may deploy the virtual machine that is migrated into the data center at the network virtualization edge of the data center, and may generate a route for the virtual machine that is migrated into the data center according to the correspondence between the address information of the virtual machine migrated into the data center and the address information of the network virtualization edge.

Here, according to whether the data center advertises a host route or a network segment route outwards when the virtual machine is migrated into the data center, the following two sub-cases may be included:

Sub-Case 1: The Data Center has Advertised the Network Segment Route of the Subnet.

When the route control identifier received by the gateway device in the data center is a host route control identifier, the gateway device in the data center deletes the network segment route of the subnet, generates, according to an acquired correspondence between an address of the virtual machine and an address of the network virtualization edge, where the network virtualization edge is in the data center and the virtual machine is located at the network virtualization edge, a host route of the virtual machine, and generates a host route of an original virtual machine that belongs to the subnet and is in the data center;

When the route control identifier is a network segment route control identifier, the network segment route of the subnet is retained.

For example, if virtual machines VM 7 and VM 8 which belong to the first subnet are deployed in the data center, and the data center advertises the network segment route 10.0.0.0/24 of VM 7 and VM 8, in a case in which VM 1 in the first subnet is migrated into the data center, if the route control identifier received by the gateway device in the data center is a host route control identifier, the gateway device deletes the network segment route 10.0.0.0/24, generates, according to a correspondence between VM 1 and the network virtualization edge, a host route of VM 1, and generates host routes of VM 7 and VM 8.

When the gateway device in the data center receives a network segment route control identifier, the network segment route 10.0.0.0/24 is retained, and VM 1, VM 7, and VM 8 share the network segment route 10.0.0.0/24.

Sub-Case 2: The Data Center has Advertised Host Routes of all Virtual Machines in the Subnet.

When receiving a host route control identifier, the gateway device in the data center generates, according to the acquired correspondence between the address of the virtual machine and the address of a network virtualization edge, a host route of the virtual machine, where the network virtualization edge is in the data center and the virtual machine is located at the network virtualization edge; when receiving a network segment route control identifier, the gateway device in the data center deletes the host routes of all the virtual machines that belong to the subnet and are in the data center, and generates the network segment route of the subnet.

For example, virtual machines VM 7 and VM 8 which belong to in the data center are deployed in the first subnet, and the data center advertises the host routes of VM 7 and VM 8, which are respectively 10.0.0.1/32 and 10.0.0.2/32. When VM 1 is migrated into the data center, and the gateway device in the data center receives a host route control identifier, the gateway device generates, according to a correspondence between address information of VM 1 and address information of the network virtualization edge, a host route 10.0.0.4/32 of VM 1. At this moment, the host routes of VM 7 and VM 8 are not adjusted.

When the gateway device in the data center receives a network segment route control identifier, the gateway device deletes the host routes of VM 7 and VM 8, and generates the network segment route 10.0.0.0/24 of the first subnet. At this moment, VM 1, VM 7, and VM 8 share the network segment route.

In Embodiment 2, when a virtual machine is migrated out of or migrated into a data center, according to received different route control identifiers for adjusting routing information, the data center adjusts routing information of all virtual machines in a subnet to which the virtual machine migrated out of or migrated into be data center belongs in the data center, for example, generates a host route or a network segment route or deletes a host route or a network segment route. In this way, when a lot of virtual machines are migrated, a large amount of routing information may not be generated, thereby reducing an amount of routing information stored in a router of the data center, reducing the number of times of route matching when the router forwards a packet, and increasing a packet forwarding speed and forwarding efficiency of the router.

Embodiment 3

Figure 3:
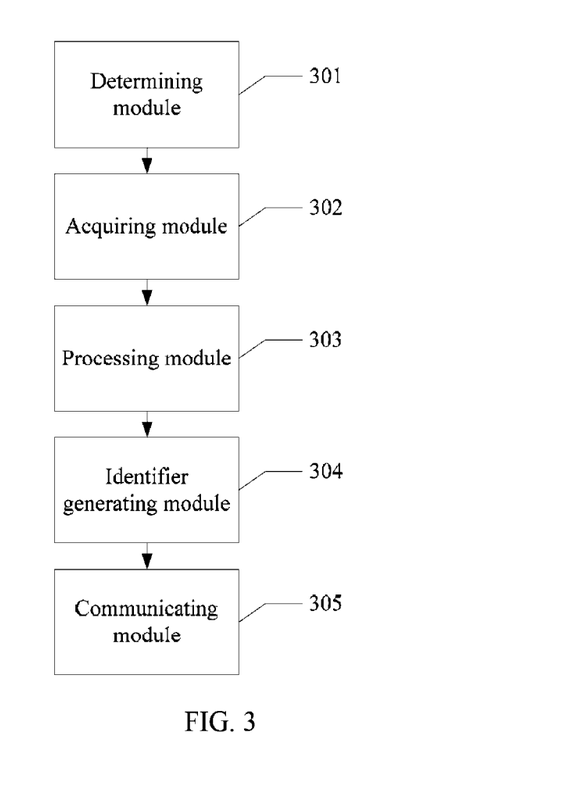
FIG. 3 is a schematic structural diagram of an apparatus for controlling generation of routing information according to an embodiment of the present invention.

Corresponding to the method for controlling generation of routing information according to Embodiment 1 of the present invention, this embodiment of the present invention further provides an apparatus for controlling generation of routing information. FIG. 3 is a schematic structural diagram of the apparatus for controlling generation of routing information according to this embodiment of the present invention. The apparatus includes:

a determining module 301, configured to: when it is detected that a virtual machine is migrated out of or migrated into a data center in which the apparatus is located, acquire a subnet to which the virtual machine belongs;

an acquiring module 302, configured to acquire the total number of virtual machines included in the subnet, and acquire the number of virtual machines that belong to the subnet and are in the data center;

a processing module 303, configured to determine a ratio of the number of the virtual machines that belong to the subnet and are in the data center to the total number of virtual machines included in the subnet;

an identifier generating module 304, configured to: according to a result of comparison between the ratio and a preset threshold, generate a route control identifier for adjusting routing information of a virtual machine that belongs to the subnet and is in the data center; and a communicating module 305, configured to send the route control identifier to the data center, where the route control identifier is used to instruct the data center to adjust, according to the route control identifier, the routing information of the virtual machine that belongs to the subnet and is in the data center.

Further, when it is detected that a virtual machine is migrated out of the data center, the identifier generating module 304 is specifically configured to: when the ratio is less than the preset threshold, generate a host route control identifier, where the host route control identifier is used to instruct the data center to delete a network segment route of the subnet to which the virtual machine migrated out of the data center belongs, and generate host routes of all the virtual machines that belong to the subnet and are in the data center; when the ratio is greater than the preset threshold, generate a network segment route control identifier, where the network segment route control identifier is used to instruct the data center to retain a network segment route of the subnet to which the virtual machine migrated out of the data center belongs.

Further, when it is detected that a virtual machine is migrated into the data center, the identifier generating module 304 is specifically configured to: when the ratio is less than the preset threshold, generate a host route control identifier, where the host route control identifier is used to instruct the data center to generate a host route of the virtual machine migrated into the data center; when the ratio is greater than the preset threshold, generate a network segment route control identifier, where the network segment route control identifier is used to instruct the data center to generate a network segment route of the subnet, and delete host routes of all the virtual machines that belong to the subnet and are in the data center.

Figure 4:
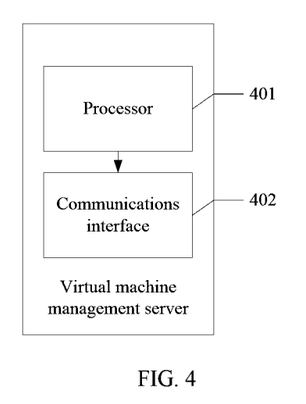
FIG. 4 is a schematic structural diagram of a virtual machine management server according to an embodiment of the present invention.

In addition, corresponding to the method for controlling generation of routing information according to Embodiment 1 of the present invention, this embodiment of the present invention provides a virtual machine management server. FIG. 4 is a schematic structural diagram of the virtual machine management server according to this embodiment of the present invention. The virtual machine management server includes:

a processor 401, configured to: when it is detected that a virtual machine connected to the virtual machine management server is migrated out of or migrated into a data center, determine a subnet to which the virtual machine belongs, acquire the total number of virtual machines included in the subnet, acquire the number of virtual machines that belong to the subnet and are in the data center, determine a ratio of the number of the virtual machines that belong to the subnet and are in the data center to the total number of virtual machines included in the subnet, and generate, according to a result of comparison between the ratio and a preset threshold, a route control identifier for adjusting routing information of a virtual machine that belongs to the subnet and is in the data center; and a communications interface 402, connected to the processor 401 and configured to send the route control identifier generated by the processor 401 to the data center, where the route control identifier is used to instruct the data center to adjust, according to the route control identifier, the routing information of the virtual machine that belongs to the subnet and is in the data center.

Further, the processor 401 is specifically configured to: when it is detected that a virtual machine is migrated out of the data center, if the ratio is less than the preset threshold, generate a host route control identifier, where the host route control identifier is used to instruct the data center to delete a network segment route of the subnet to which the virtual machine migrated out of the data center belongs, and generate host routes of all the virtual machines that belong to the subnet and are in the data center; if the ratio is greater than the preset threshold, generate a network segment route control identifier, where the network segment route control identifier is used to instruct the data center to retain a network segment route of the subnet to which the virtual machine migrated out of the data center belongs.

Further, the processor 401 is specifically configured to: when it is detected that a virtual machine is migrated into the data center, if the ratio is less than the preset threshold, generate a host route control identifier, where the host route control identifier is used to instruct the data center to generate a host route of the virtual machine migrated into the data center; if the ratio is greater than the preset threshold, generate a network segment route control identifier, where the network segment route control identifier is used to instruct the data center to generate a network segment route of the subnet, and delete host routes of all the virtual machines that belong to the subnet and are in the data center.

Embodiment 4

Figure 5:
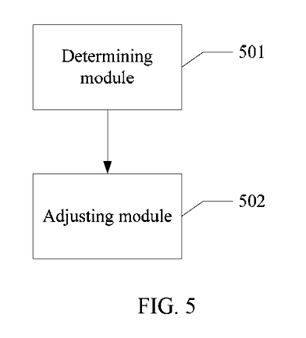
FIG. 5 is a schematic structural diagram of an apparatus for generating routing information according to an embodiment of the present invention.

Corresponding to the method for generating routing information according to Embodiment 2 of the present invention, this embodiment of the present invention further provides an apparatus for generating routing information. FIG. 5 is a schematic structural diagram of an apparatus for generating routing information according to this embodiment of the present invention. The apparatus for generating routing information includes:

a determining module 501, configured to: when a virtual machine is migrated out of or migrated into a data center in which the apparatus is located, determine a subnet to which the virtual machine belongs; and an adjusting module 502, configured to: according to a received route control identifier for adjusting routing information, adjust routing information of a virtual machine that belongs to the subnet and is in the data center.

Further, when a virtual machine is migrated out of the data center and the data center has advertised a network segment route of the subnet, the adjusting module 502 is specifically configured to: when the route control identifier is a host route control identifier, delete the network segment route of the subnet in the data center, and generate host routes of all virtual machines that belong to the subnet and are in the data center; when the route control identifier is a network segment route control identifier, retain the network segment route of the subnet.

Further, when a virtual machine is migrated out of the data center and the data center has advertised host routes of all virtual machines that belong to the subnet and are in the data center, the adjusting module 502 is specifically configured to: when the route control identifier is a host route control identifier, delete a host route of the virtual machine migrated out of the data center; when the route control identifier is a network segment route control identifier, delete the host routes of all the virtual machines that belong to the subnet and are in the data center, and generate a network segment route of the subnet.

Further, when a virtual machine is migrated into the data center and the data center has advertised a network segment route of the subnet, the adjusting module 502 is specifically configured to: when the route control identifier is a host route control identifier, delete the network segment route of the subnet, generate, according to an acquired correspondence between an address of the virtual machine and an address of a network virtualization edge, a host route of the virtual machine migrated into the data center, where the network virtualization edge is in the data center and the virtual machine is located at the network virtualization edge, and generate a host route of an original virtual machine that belongs to the subnet and is in the data center; when the route control identifier is a network segment route control identifier, retain the network segment route of the subnet.

Further, when a virtual machine is migrated into the data center and the data center has advertised host routes of all virtual machines that belong to the subnet and are in the data center, the adjusting module 502 is specifically configured to: when the route control identifier is a host route control identifier, generate, according to an acquired correspondence between an address of the virtual machine and an address of a network virtualization edge, a host route of the virtual machine migrated into the data center, where the network virtualization edge is in the data center and the virtual machine is located at the network virtualization edge; when the route control identifier is a network segment route control identifier, generate, according to the acquired correspondence between an address of the virtual machine and an address of a network virtualization edge, a network segment route of the subnet, where the network virtualization edge is in the data center and the virtual machine is located at the network virtualization edge, and delete the host routes of all the virtual machines that belong to the subnet and are in the data center.

Figure 6:
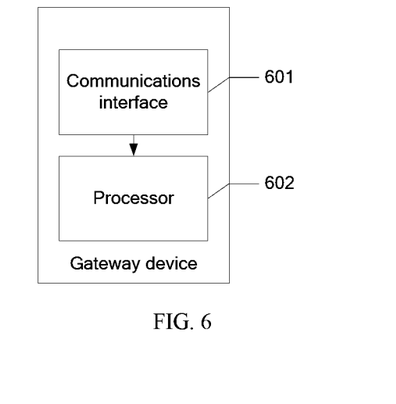
FIG. 6 is a schematic structural diagram of a gateway device according to an embodiment of the present invention.

In addition, corresponding to the method for generating routing information according to Embodiment 2 of the present invention, this embodiment of the present invention further provides a gateway device. FIG. 6 is a schematic structural diagram of the gateway device according to this embodiment of the present invention. The virtual machine management server includes:

a communications interface 601, configured to: when a virtual machine is migrated out of or migrated into a data center in which the gateway device is located, receive a route control identifier for adjusting routing information; and a processor 602, configured to determine a subnet to which the virtual machine belongs, and adjust, according to the received route control identifier, routing information of a virtual machine that belongs to the subnet and is in the data center.

Further, the processor 602 is specifically configured to: when a virtual machine is migrated out of the data center and the data center has advertised a network segment route of the subnet, if the route control identifier is a host route control identifier, delete the network segment route of the subnet in the data center, and generate host routes of all virtual machines that belong to the subnet and are in the data center; if the route control identifier is a network segment route control identifier, retain the network segment route of the subnet.

Further, the processor 602 is specifically configured to: when a virtual machine is migrated out of the data center and the network data center has advertised host routes of all virtual machines that belong to the subnet and are in the data center, if the route control identifier is a host route control identifier, delete a host route of the virtual machine migrated out of the data center; if the route control identifier is a network segment route control identifier, delete the host routes of all the virtual machines that belong to the subnet and are in the data center, and generate a network segment route of the subnet.

Further, the processor 602 is specifically configured to: when a virtual machine is migrated into the data center and the data center has advertised a network segment route of the subnet, if the route control identifier is a host route control identifier, delete the network segment route of the subnet, generate, according to an acquired correspondence between an address of the virtual machine and an address of a network virtualization edge, a host route of the virtual machine migrated into the data center, where the network virtualization edge is in the data center and the virtual machine is located at the network virtualization edge, and generate a host route of an original virtual machine that belongs to the subnet and is in the data center; if the route control identifier is a network segment route control identifier, retain the network segment route of the subnet.

Further, the processor 602 is specifically configured to: when a virtual machine is migrated into the data center and the data center has advertised host routes of all virtual machines that belong to the subnet and are in the data center, if the route control identifier is a host route control identifier, generate, according to an acquired correspondence between an address of the virtual machine and an address of a network virtualization edge, a host route of the virtual machine migrated into the data center, where the network virtualization edge is in the data center and the virtual machine is located at the network virtualization edge; if the route control identifier is a network segment route control identifier, generate, according to the acquired correspondence between the address of the virtual machine and the address of a network virtualization edge, a network segment route of the subnet, where the network virtualization edge is in the data center and the virtual machine is located at the network virtualization edge, and delete the host routes of all the virtual machines that belong to the subnet and are in the data center.

The present invention is described with reference to flowcharts and/or block diagrams of a method, a device (system), and a computer program product according to the embodiments of the present invention. It should be understood that each flow and/or block in the flowcharts and/or block diagrams, and combinations of flows and/or blocks in the flowcharts and/or block diagrams may be implemented by computer program instructions. These computer program instructions may be provided to a general-purpose computer, a special-purpose computer, an embedded processor, or processors of other programmable data processing devices to produce a machine, so that the instructions executed by the computer or the processors of the other programmable data processing devices generate an apparatus for implementing a function specified in one or more flows in the flowcharts and/or one or more blocks in the block diagrams.

These computer program instructions may also be stored in a computer-readable memory capable of directing a computer or other programmable data processing devices to function in a particular manner, so that the instructions stored in the computer-readable memory produce a manufactured product including an instruction apparatus, where the instruction apparatus implements a function specified in one or more flows in the flowcharts and/or one or more blocks in the block diagrams.

These computer program instructions may also be loaded onto a computer or other programmable data processing devices, so that a series of operation steps are executed on the computer or the other programmable devices to generate processes implemented by the computer. Therefore, the instructions executed on the computer or the other programmable devices provide steps for implementing a function specified in one or more flows in the flowcharts and/or one or more blocks in the block diagrams.

Although preferred embodiments of the present invention have been described, those skilled in the art may make additional changes and modifications to these embodiments once learning about basic inventive concepts. Therefore, the appended claims are intended to be explained as to include the preferred embodiment as well as all changes and modifications falling within the scope of the present invention.

Obviously, those skilled in the art may perform various modifications and variations to the present invention without departing from the scope of the present invention. Therefore, if these modifications and variations of the present invention are within the scope of the claims and equivalent technologies of the present invention, the present invention is also intended to include these modifications and variations.

What is claimed is:

1. A method for controlling generation of routing information, comprising:
    when it is detected that a virtual machine is migrated out of or migrated into a data center, determining a subnet to which the virtual machine belongs;
    acquiring the total number of virtual machines included in the subnet, and acquiring the number of virtual machines that belong to the subnet and are in the data center;
    determining a ratio of the number of the virtual machines that belong to the subnet and are in the data center to the total number of virtual machines included in the subnet;
    generating, according to a result of comparison between the ratio and a preset threshold, a route control identifier for adjusting routing information of a virtual machine that belongs to the subnet and is in the data center; and
    sending the route control identifier to the data center, wherein the route control identifier is used to instruct the data center to adjust, according to the route control identifier, routing information of the virtual machine that belongs to the subnet and is in the data center.

2. The method according to claim 1, wherein when it is detected that a virtual machine is migrated out of the data center, the generating, according to a result of comparison between the ratio and a preset threshold, a route control identifier for adjusting routing information of a virtual machine that belongs to the subnet and is in the data center comprises:
    when the ratio is less than the preset threshold, generating a host route control identifier, wherein the host route control identifier is used to instruct the data center to delete a network segment route of the subnet to which the virtual machine migrated out of the data center belongs, and generate host routes of all virtual machines that belong to the subnet and are still in the data center; or
    when the ratio is greater than the preset threshold, generating a network segment route control identifier, wherein the network segment route control identifier is used to instruct the data center to retain a network segment route of the subnet to which the virtual machine migrated out of the data center belongs.

3. The method according to claim 1, wherein when it is detected that a virtual machine is migrated into the data center, the generating, according to a result of comparison between the ratio and a preset threshold, a route control identifier for adjusting routing information of a virtual machine that belongs to the subnet and is in the data center comprises:

when the ratio is less than the preset threshold, generating a host route control identifier, wherein the host route control identifier is used to instruct the data center to generate a host route of the virtual machine migrated into the data center; or when the ratio is greater than the preset threshold, generating a network segment route control identifier, wherein the network segment route control identifier is used to instruct the data center to generate a network segment route of the subnet, and delete host routes of all the virtual machines that belong to the subnet and are in the data center.

4. A method for generating routing information, comprising:

when a virtual machine is migrated out of or migrated into a data center, determining a subnet to which the virtual machine belongs; and adjusting, according to a received route control identifier for adjusting routing information, routing information of a virtual machine that belongs to the subnet and is in the data center, wherein the route control identifier is generated according to a result of a comparison between a ratio and a preset threshold, where the ratio is (a) a number of virtual machines belonging to the subnet and in the data center and (b) a total number of virtual machines included in the subnet.

5. The method according to claim 4, wherein when a virtual machine is migrated out of the data center and the data center has advertised a network segment route of the subnet, the adjusting, according to a received route control identifier for adjusting routing information, routing information of a virtual machine that belongs to the subnet and is in the data center comprises:

when the route control identifier is a host route control identifier, deleting the network segment route of the subnet in the data center, and generating host routes of all virtual machines that belong to the subnet and are in the data center; or when the route control identifier is a network segment route control identifier, retaining the network segment route of the subnet.

6. The method according to claim 4, wherein when a virtual machine is migrated out of the data center and the data center has advertised host routes of all virtual machines that belong to the subnet and are in the data center, the adjusting, according to a received route control identifier for adjusting routing information, routing information of a virtual machine that belongs to the subnet and is in the data center comprises:

when the route control identifier is a host route control identifier, deleting a host route of the virtual machine migrated out of the data center; or when the route control identifier is a network segment route control identifier, deleting the host routes of all the virtual machines that belong to the subnet and are in the data center, and generating a network segment route of the subnet.

7. The method according to claim 4, wherein when a virtual machine is migrated into the data center and the data center has advertised a network segment route of the subnet, the adjusting, according to a received route control identifier for adjusting routing information, routing information of a virtual machine that belongs to the subnet and is in the data center comprises:

when the route control identifier is a host route control identifier, deleting the network segment route of the subnet, generating, according to an acquired correspondence between an address of the virtual machine and an address of a network virtualization edge, a host route of the virtual machine migrated into the data center, where the network virtualization edge is in the data center and the virtual machine is located at the network virtualization edge, and generating a host route of an original virtual machine that belongs to the subnet and is in the data center; or when the route control identifier is a network segment route control identifier, retaining the network segment route of the subnet.

8. The method according to claim 4, wherein when a virtual machine is migrated into the data center and the data center has advertised host routes of all virtual machines that belong to the subnet and are in the data center, the adjusting, according to a received route control identifier for adjusting routing information, routing information of a virtual machine that belongs to the subnet and is in the data center comprises:

when the route control identifier is a host route control identifier, generating, according to an acquired correspondence between an address of the virtual machine and an address of a network virtualization edge, a host route of the virtual machine migrated into the data center, where the network virtualization edge is in the data center and the virtual machine is located at the network virtualization edge; or when the route control identifier is a network segment route control identifier, generating, according to an acquired correspondence between an address of the virtual machine and an address of a network virtualization edge, a network segment route of the subnet, where the network virtualization edge is in the data center and the virtual machine is located at the network virtualization edge, and deleting the host routes of all the virtual machines that belong to the subnet and are in the data center.

9. An apparatus for controlling generation of routing information, comprising:

a processor configured to:
when it is detected that a virtual machine is migrated out of or migrated into a data center in which the apparatus is located, determine a subnet to which the virtual machine belongs;

acquire the total number of virtual machines included in the subnet, and acquire the number of virtual machines that belong to the subnet and are in the data center;

determine a ratio of the number of the virtual machines that belong to the subnet and are in the data center to the total number of virtual machines included in the subnet;

according to a result of comparison between the ratio and a preset threshold, generate a route control identifier for adjusting routing information of a virtual machine that belongs to the subnet and is in the data center; and a communications interface, configured to
send the route control identifier to the data center, wherein the route control identifier is used to instruct the data center to adjust, according to the route control identifier, routing information of the virtual machine that belongs to the subnet and is in the data center.

10. The apparatus according to claim 9, wherein the processor is specifically configured to: when it is detected that a virtual machine is migrated out of the data center, if the ratio is less than the preset threshold, generate a host route control identifier, wherein the host route control identifier is used to instruct the data center to delete a network segment route of the subnet to which the virtual machine migrated out of the data center belongs, and generate host routes of all virtual machines that belong to the subnet and are still in the data center; if the ratio is greater than the preset threshold, generate a network segment route control identifier, wherein the network segment route control identifier is used to instruct the data center to retain a network segment route of the subnet to which the virtual machine migrated out of the data center belongs.

11. The apparatus according to claim 9, wherein the processor is specifically configured to: when it is detected that a virtual machine is migrated into the data center, if the ratio is less than the preset threshold, generate a host route control identifier, wherein the host route control identifier is used to instruct the data center to generate a host route of the virtual machine migrated into the data center; if the ratio is greater than the preset threshold, generate a network segment route control identifier, wherein the network segment route control identifier is used to instruct the data center to generate a network segment route of the subnet, and delete host routes of all the virtual machines that belong to the subnet and are in the data center.

12. An apparatus for generating routing information, comprising:
a processor configured to when a virtual machine is migrated out of or migrated into a data center in which the apparatus is located, determine a subnet to which the virtual machine belongs;
a communications interface configured to receive a router control identifier for adjusting routing information; and
the processor is further configured to adjust routing information of a virtual machine that belongs to the subnet and is in the data center according to the received router control identifier;
wherein the route control identifier is generated according to a result of a comparison between a ratio and a preset threshold, where the ratio is (a) a number of virtual machines belonging to the subnet and in the data center and (b) a total number of virtual machines included in the subnet.

13. The apparatus according to claim 12, wherein the data center is specifically configured to: when a virtual machine is migrated out of the data center and the data center has advertised a network segment route of the subnet, if the route control identifier is a host route control identifier, delete the network segment route of the subnet in the data center, and generate host routes of all virtual machines that belong to the subnet and are in the data center; if the route control identifier is a network segment route control identifier, retain the network segment route of the subnet.

14. The apparatus according to claim 12, wherein the data center is specifically configured to: when a virtual machine is migrated out of the data center and the data center has advertised host routes of all virtual machines that belong to the subnet and are in the data center, if the route control identifier is a host route control identifier, delete a host route of the virtual machine migrated out of the data center; if the route control identifier is a network segment route control identifier, delete the host routes of all the virtual machines that belong to the subnet and are in the data center, and generate a network segment route of the subnet.

15. The apparatus according to claim 12, wherein the data center is specifically configured to: when a virtual machine is migrated into the data center and the data center has advertised a network segment route of the subnet, if the route control identifier is a host route control identifier, delete the network segment route of the subnet, generate, according to an acquired correspondence between an address of the virtual machine and an address of a network virtualization edge, a host route of the virtual machine migrated into the data center, where the network virtualization edge is in the data center and the virtual machine is located at the network virtualization edge, and generate a host route of an original virtual machine that belongs to the subnet and is in the data center; if the route control identifier is a network segment route control identifier, retain the network segment route of the subnet.

16. The apparatus according to claim 12, wherein the data center is specifically configured to: when a virtual machine is migrated into the data center and the data center has advertised host routes of all virtual machines that belong to the subnet and are in the data center, if the route control identifier is a host route control identifier, generate, according to an acquired correspondence between an address of the virtual machine and an address of a network virtualization edge, a host route of the virtual machine migrated into the data center, where the network virtualization edge is in the data center and the virtual machine is located at the network virtualization edge; if the route control identifier is a network segment route control identifier, generate, according to an acquired correspondence between an address of the virtual machine and an address of a network virtualization edge, a network segment route of the subnet, where the network virtualization edge is in the data center and the virtual machine is located at the network virtualization edge, and delete the host routes of all the virtual machines that belong to the subnet and are in the data center.

* * * * *